US009667535B2

(12) United States Patent
Maslak (10) Patent No.: US 9,667,535 B2
(45) Date of Patent: May 30, 2017

(54) MULTI-PEER ROUTING IN A NETWORK (71) Applicant: Level 3 Communications, LLC, Broomfield, CO (US)

(72) Inventor: Joel C. Maslak, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 293 days.

(21) Appl. No.: 14/302,215

(22) Filed: Jun. 11, 2014

(65) Prior Publication Data
US 2015/0365321 A1 Dec. 17, 2015

(51) Int. Cl.
*G06F 15/16* (2006.01)
*H04L 12/721* (2013.01)
*H04L 29/08* (2006.01)

(52) U.S. Cl.
CPC .......... *H04L 45/44* (2013.01); *H04L 67/1004* (2013.01)

(58) Field of Classification Search
USPC ........ 709/213, 217, 218, 227, 228, 229, 240
See application file for complete search history.

(56) References Cited

U.S. PATENT DOCUMENTS

| 6,192,051 | B1* | 2/2001 | Lipman | H04L 45/00 370/389 |
| 2003/0231659 | A1* | 12/2003 | DiMambro | H04L 29/06 370/473 |
| 2004/0003147 | A1* | 1/2004 | Masputra | H04L 29/06 710/52 |
| 2008/0089241 | A1* | 4/2008 | Lloyd | H04L 12/2602 370/253 |
| 2008/0225888 | A1* | 9/2008 | Valluri | H04L 67/02 370/466 |
| 2012/0271765 | A1* | 10/2012 | Cervenka | G06Q 20/32 705/44 |
| 2014/0098685 | A1 | 4/2014 | Shattil | |
| 2016/0021025 | A1* | 1/2016 | Patel | H04L 47/823 370/329 |

OTHER PUBLICATIONS

International Search Report dated Sep. 15, 2015, Int'l Appl. No. PCT/US15/035156, Int'l Filing Date Jun. 10, 2015, 3 pgs.

(Continued)

*Primary Examiner* — Liangche A Wang (57) ABSTRACT

Aspects of the present disclosure involve systems, methods, computer program products, and the like, for managing the distribution of content and/or communications from a computer network to an end user of the network. In general, the system receives a request for content from the network from a user of the network and determines a server or content providing component within the network to provide the content to the user. In addition, the network may reduce the number of components and distance requests for the content are transmitted through the associated networks. In one embodiment, the network may provide altered destination paths to one or more access networks through which the end user accesses the network. The altered destination paths may be used by the end user's service provider or local network to select an access network for accessing the computer network to minimize the impact on the computer network for providing the content to the end user.

20 Claims, 5 Drawing Sheets (56) References Cited

OTHER PUBLICATIONS

Written Opinion of the International Searching Authority dated Sep. 15, 2015, Int'l Appl. No. PCT/US15/035156, Int'l Filing Date Jun. 10, 2015; 5 pgs.

International Preliminary Report on Patentability, dated Dec. 15, 2016, Int'l Appl. No. PCT/US15/035156, Int'l Filing Date Jun. 10, 2015; 7 pgs.

* cited by examiner

MULTI-PEER ROUTING IN A NETWORK

TECHNICAL FIELD

Aspects of the present disclosure generally relate to network resource selection and delivery in a computer network, and more particularly to processing or otherwise manipulating routing of content or communications from a computer network based on one or more business considerations or policy.

BACKGROUND

Telecommunication or other types of computer networks provide for the transmission of information across some distance through terrestrial, wireless or satellite communication networks. Such communications may involve voice, data or multimedia information, among others. Typically, such networks include several servers or other resources from which the content or network services can be supplied to a requesting end user. To decrease latency, increase throughput and reduce the amount of traffic being transmitted through a related network, a network will typically attempt to provide the content or communications from a network component that is separated by as little network infrastructure as possible from the requesting device. Thus, a request received from an end user in Denver, Colo. for access to the network is preferably served from a server such that the fewest number of network elements and communication cable distance between the server and the end user are utilized. However, because most end users can access the network through one or more access networks, there may be present several transmission paths between the network server and the end user. Therefore, the route that utilizes the least number of network elements and communication distance may not always be selected by the end user device. Such circumstances may exact an unnecessary usage cost or performance impact for the network.

In addition, it is often the case that an individual network resource, such as a content distribution network (CDN) content-providing server, will utilize one access network to reach an end user while utilizing a separate, non-symmetric path for the user to contact the network resource. For instance, a CDN server may utilize a first access network to reach an end user device, but the end user device may utilize a second access network to contact the CDN server. However, similar to the situation described above, this structure of communication between the end user and the CDN may be utilizing more network elements and communication distance than necessary.

It is with these and other issues in mind that various aspects of the present disclosure were developed.

SUMMARY

One implementation of the present disclosure may take the form of a method for optimizing inbound traffic for a network. The method includes the operations of storing, in a network device of a computer network, a geographic area of a particular component of the computer network and obtaining geographic areas for each connection between the computer network and a plurality of access networks. In addition, the method includes comparing the geographic area of the particular component of the computer network and the geographic areas for each connection between the computer network and the plurality of access networks to determine a first subset of the plurality of access networks, wherein the first subset of the plurality of access networks comprises the one or more access networks that connect to the computer network in the same geographic area as the geographic area of the particular component of the computer network and transmitting a preferred path element for the particular component of the computer network to the first subset of the plurality of access networks.

Another implementation of the present disclosure may take the form of a computer network. The network includes a networking device configured to communicate with an end user network associated with the computer network and a computer network component. The computer network component is configured to obtain a geographic area of the networking device, receive geographic areas for each connection between the computer network and a plurality of access networks, compare the geographic area of the networking device and the geographic areas for each connection between the computer network and the plurality of access networks to determine a first subset of the plurality of access networks comprising one or more access networks that connect to the computer network in the same geographic area as the geographic area of the networking device and transmit a preferred access route for the networking device to the first subset of the plurality of access networks.

Yet another implementation of the present disclosure may take the form of a system for operating a computer network. The system includes a server comprising a processor and a computer-readable medium associated with the processor. The computer-readable medium includes instructions that are stored thereon and are executable by the processor. The instructions cause the processor to store, in the server, a geographic area of a particular component of the computer network, obtain geographic areas for each connection between the computer network and a plurality of access networks and compare the geographic area of the particular component and the geographic areas for each connection between the computer network and a plurality of access networks to determine a first subset of the plurality of access networks, wherein the first subset of the plurality of access networks comprises the one or more access networks that connect to the computer network in the same geographic area as the geographic area of the particular component. The instructions also cause the processor to transmit a preferred element of an access path for the particular component to the first subset of the plurality of access networks.

DETAILED DESCRIPTION

Aspects of the present disclosure involve systems, methods, computer program products, and the like, for managing the distribution of content and/or communications from a computer network to an end user of the network. In general, the system receives a request for content from the network from a user of the network and determines a server or content providing component within the network to provide the content to the user. In addition, the network may reduce the number of components and distance requests for the content are transmitted through the associated networks. In one embodiment, the network may provide altered destination paths to one or more access networks through which the end user accesses the network. The altered destination paths may be used by the end user's service provider or local network to select an access network for accessing the computer network to minimize the impact on the computer network for providing the content to the end user.

In one embodiment, the network determines a connection relationship between the network and one or more access networks. In particular, the network determines the geographic locations of interconnects between the network and the one or more access networks connect to the network. In addition, the network may locate the geographic areas that can be used to serve content offered by the network. To reduce the transmission of the particular content through the network, the network may correlate the content with the one or more access networks that connect to the network in the same or similar geographic areas. Upon correlation, the network may provide altered destination paths for the particular content to one or more access networks through which the end user accesses the network that correlate with the geographic area of the content. For example, a particular content may be stored in a server in the network at or near Seattle, Wash. Further, a particular access network to the network may be connected to the network in Seattle, Wash., among other locations. Thus, the network may correlate the location of the particular content to the particular access network connected to the network at the same or near the same location.

Further, the network, upon correlation of the content to one or more access networks, may provide or announce an access path to reach the content to the correlated one or more access networks. Further, the network may announce a separate or altered access path to reach the content for other access networks connected to the network (those access networks that are not correlated with the content). In general, the altered access path may instruct the end user device, local network, or end user's Internet Service Provider (ISP) to not use the altered access path to contact the network to request content or acknowledge receipt of content from the network. In other words, the altered access path may bias the end user device to request and acknowledge receipt of the content through the correlated access network when the end user device has the option of requesting and acknowledging receipt the content through more than one access network. In this manner, the network may reduce the transmission load on the network by receiving requests and acknowledgments for content from the end user device through an access network that is correlated to a geographic area similar to the content, rather than receiving it as a geographically distant location and carrying that communication to the content serving location. Reduction of the transmission load and latency may allow the network to perform more efficiently.

Figure 1:
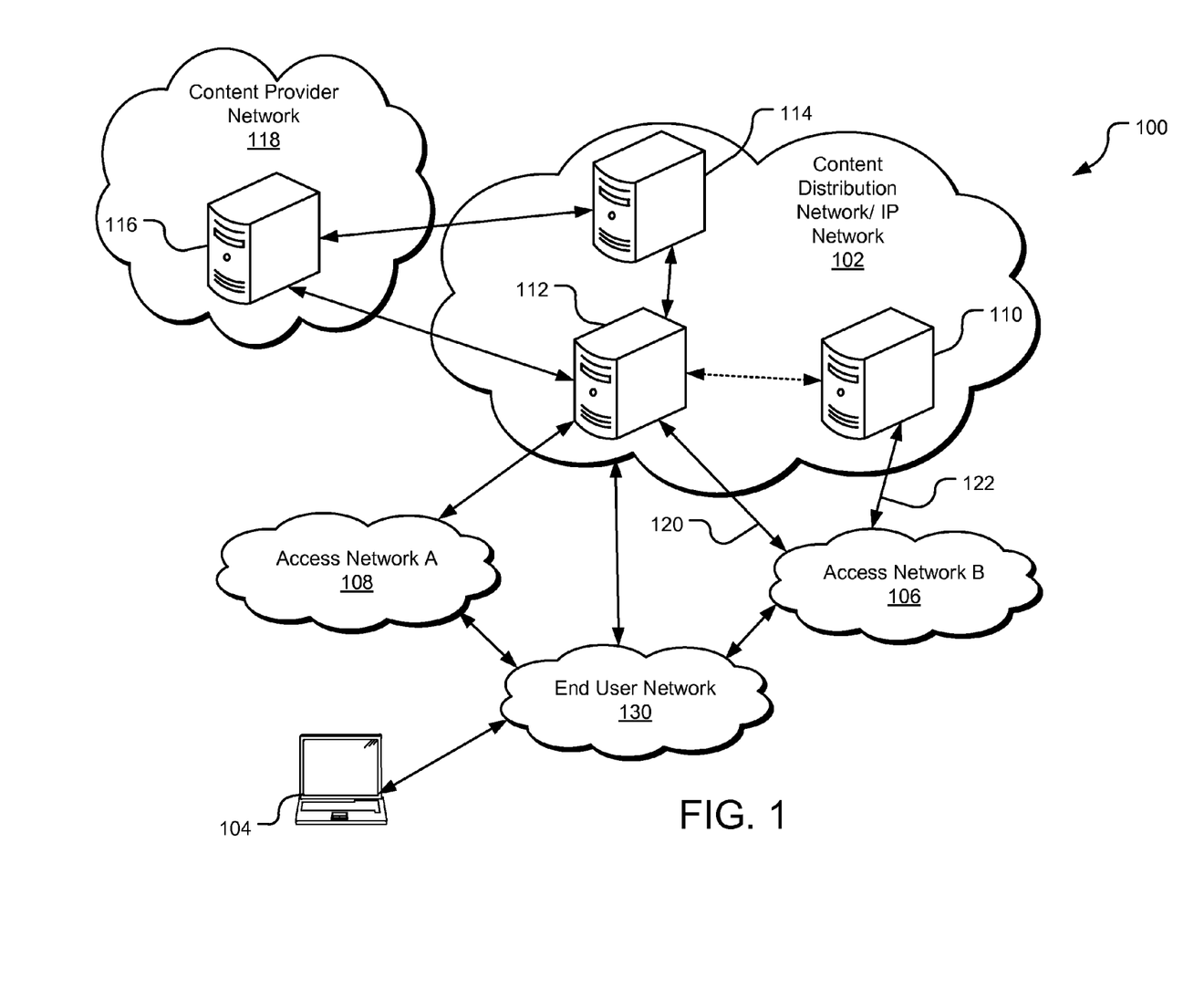
FIG. 1 is an example network environment for distributing content to an end user from a network, such as a content delivery network (CDN).

FIG. 1 is an example network environment 100 for distributing content to one or more users. In one implementation, a CDN 102 is communicably coupled to one or more access networks 106, 108. Although a CDN 102 is illustrated in FIG. 1, it should be appreciated that the embodiments of the present disclosure may be utilized in any type of computer network, including but not limited to, a Voice over Internet Protocol (VoIP) network, a Domain Name System (DNS) network, enterprise network and the like. Regardless of the type of network used, the one or more access networks 106, 108 may be under the control of or operated/maintained by one or more entities that provide access to the CDN 102. For example, the network environment 100 of FIG. 1 illustrates two access networks, namely access network A 108 and access network B 106, through which content may be retrieved from the CDN 102. To access the CDN 102, a user may utilize an end user device 104 (discussed in more detail below) to access an end user network 130. The end user network 130 may provide Internet access to a user device 104 associated with an end user network, such as, for example, one or more Internet Service Providers (ISPs). In turn, the end user network 104 utilizes one or more access networks 106, 108 to obtain content from the CDN 102. The process through which the end user network 130 selects an access network 106, 108 to access the CDN 102 is discussed in greater detail below. In one embodiment, the end user network 130 may access the CDN 102 directly.

As mentioned, the CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent through the end user network 130 and one or more access network 106, 108 to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content.

In one implementation, the CDN 102 includes an edge server 112, which may cache content from another server to make it available in a more geographically or logically proximate location to the user device 104. The edge server 112 may reduce network loads, free capacity, lower delivery costs, and/or reduce content download time. The edge server 112 is configured to provide requested content to a requestor, which may be the user device 104 possibly via an intermediate device, for example, in the access network 106, 108. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

In addition, the CDN may broadcast to the access networks 106, 108 connected to the CDN information concerning the content serving nodes available in the CDN. In particular, the CDN may broadcast BGP information about the access path to content serving CDN components. In general, BGP information (or BGP session, BGP feed or BGP data) is a table of Internet Protocol (IP) prefixes which designate network connectivity between autonomous systems (AS) or separate networks. BGP information for a network route may include path, network policies and/or rule-sets for transmission along the path, among other information. The BGP feed may also include Interior Gateway Protocol (IGP) information for network routes within an AS or network and/or other network information that pertains to the transmission of content from the CDN.

As mentioned, the BGP information may include a path that designates the networks through which stored content may be accessed. In particular, a CDN may broadcast a network autonomous system identifier as part of the BGP announcement. The network identifier identifies the particular network that the content is stored on and available to an end user device. Additional network autonomous system identifiers between the end user device and the stored content may be appended to or added to the BGP path information for the content. Thus, in one embodiment, the BGP path information may provide a series of identifiers for networks through which the content may be accessed by the end user device. As described in more detail below, this information may be manipulated by the CDN or other network to potentially reduce the transmission time of the content through one or more of the connected networks.

Figure 2:
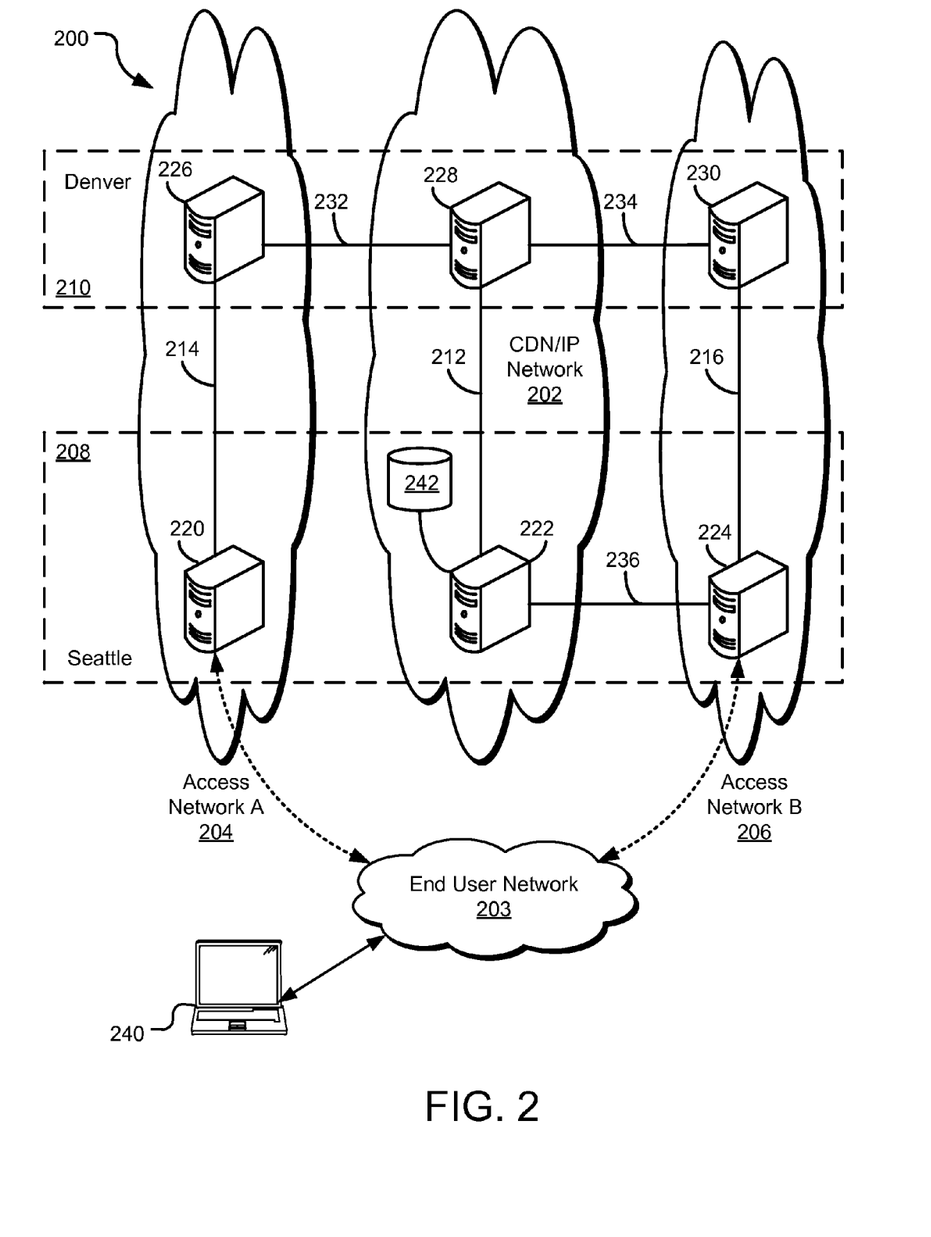
FIG. 2 is an example network environment for distributing content to one or more end users of the network, including access to the content through one or more access networks.

FIG. 2 is an example network environment for distributing content to a plurality of users of a CDN that utilizes geographically close content servers. Many of the components outlined above with reference to the network of FIG. 1 are similarly included in the network of FIG. 2. In the network 200 of FIG. 2, however, users from separate external networks (shown in FIG. 2 as access networks 204, 206) may request content from the CDN 202 or other type of network. Similar to the description to FIG. 1 above, the description of FIG. 2 utilizes a CDN example for the network, but other networks are also contemplated. As described in more detail below, while the content may be provided from the CDN 202 to the end user device 240 through the end user network 203 and either (or any) access network 204, 206 connected to the CDN, a particular access network may be preferred to reduce the transmission of the content through portion of the CDN and/or improve performance of content. Thus, the CDN 202 may provide different access paths to the different access networks 204, 206 to reduce the transmission of the content through the CDN.

In addition, the CDN 202 may send data (such as content) to the end user device 240 via either access network 204 or access network 206, while the end user device 240 or end user network 203 may independently choose access network 204 or access network 206 to send data (such as requests for content or acknowledgments of receipt of content) to the CDN. Both the end user network 203 and the CDN 202 may make the same or different decisions to prefer one access network 204, 206 over the other such that the content and the data from the end user device 240 may be carried on separate or the same access networks.

The network environment 200 of FIG. 2 includes one or more content delivery networks (CDN) 202 for delivery of content from one or more content providers to end-users. The CDN 202 is communicably coupled to one or more access networks (illustrated in FIG. 2 as access network A 204 and access network B 206). Further, an end user network 203 may connect to both or either access network A 204 and access network B 206 while providing access to the Internet for one or more end-users 240 connected to the end user network.

As should be appreciated, the networks of FIG. 2 (the CDN 202, access network A 204, access network B 206, and to some extent, the end user network 203) may be geographically large networks. For example, the CDN 202 may have components located in several cities around the world to provide content to the users of the network. The examples of the CDN 202, access network A 204, and access network B 206 shown in FIG. 2 include components located in Seattle, Wash. (indicated by dashed box 208) and Denver, Colo. (indicated by dashed box 210). In other words, each of the networks include at least one component physically located within or near these geographic locations. Further, the components within the networks 202-206 may be connected through the network. This is illustrated in FIG. 2 by the connection 212 of the CDN 202, connection 214 of access network A 204 and connection 216 of access network B 206. The connections 212-216 of components within the networks 202-206 may include any number of intervening components of the networks, including routers, servers, transmission cables, etc. Such components are not illustrated in FIG. 2 for simplicity.

As mentioned above, each network 202-206 includes components within the networks, specifically components at or near specific geographic locations. For example, access network A 204 may include a server or other network component 220 in the Seattle, Wash. area. Similarly, CDN 202 may include a server or other network component 222 and access network B 206 may include a server or other network component 224, also located in the Seattle area. Further, access network A 204 may include a server or other network component 226, CDN 202 may include a server or other network component 228 and access network B 206 may include a server or other network component 230 in the Denver, Colo. area. It should be appreciated that the location of components 220-224 in Seattle and components 226-230 in Denver is not necessarily within the city limits of the respective cities. Rather, the components may be located anywhere within the networks 202-206, but are designated or associated with the specific geographic area by the networks themselves.

Also, the networks 202-206 of FIG. 2 may also be connected to each other in one or more of the designated geographic areas. For example, access network A 204 is connected to CDN 202 in the Denver area 210 through connection 232 and access network B 206 is connected to CDN in the Denver area through connection 234. In addition, access network B 206 is connected to CDN 202 in the Seattle area 208 through connection 236 while access network A 204 is not connected to CDN in the Seattle area. Thus, each of the access networks associated with the CDN 202 may connect to the CDN in various locations through the networks footprint.

In the embodiment of FIG. 2, an end user network 203 is in communication with access network A 204 and access network B 206 to provide access to the CDN 202 through the access networks to an end user device 240. Specifically, the end user network 203 may communicate with the network component 220 of access network A 204 in Seattle 208 and with the network component 224 of access network B 206, also in Seattle. As mentioned above, the end user network 203 may access the CDN 202 through any number of components or networks, most not shown here for simplicity. Regardless, the end user network 203 of FIG. 2 may access content stored in the CDN 202 through either access network A 204 or access network B 206, while the CDN 202 may independently choose to use access network A 204 or access network B 206 to contact the end user network 203 and/or the end user device 240.

The CDN 202 may store content in the network for access by the end users of the network. In the example of FIG. 2, content available to the end user device 240 is stored in a database 242. More specifically, the database may be located near or in Seattle 208, as illustrated. Further, although it is illustrated that the database 242 is connected to server component 222 of the CDN 202, the content may be located in one or more locations and components within the CDN. Often, however, content is stored in a specific location within the CDN 202, with that location being broadcast by the CDN to associated networks such that end user devices may access the content.

As mentioned above, the end user network 203 may contact the content 242 in the CDN 202 through access network A 204 or access network B 206. However, it may be preferable to the CDN 202 that the content is requested by the end user network 203 through access network B 206. In particular, because access network B 206 is connected to the CDN 202 in the Seattle area 208, the CDN may prefer that requests for the content on the Seattle-based component 224 use access network B 206 directly across communication path 236. In this manner, the content 242 requested by the end user network 203 from CDN 202 is not transmitted long distances of through a high number of network elements. In contrast, access network A 204 is only connected to the CDN 202 through connection 232 in the Denver area 210. Thus, if the content 242 is requested by the end user network 203 through access network A 204, the content request (or acknowledgement) is first transmitted through access network A 204 to the Denver-based component 228 for transmission across communication 232 to CDN 202. The transmission of the content requests and acknowledgements through the access network A 204 from Seattle 208 to Denver 210 traverses a greater distance, resulting in increased latency and decreased performance. The increased latency may be avoided if the content is requested from access network B 206 instead within the Seattle area 208. In other words, requesting the content 242 from an access network located in the same area as the stored content reduces the network components utilized to provide the content, thereby increasing the performance of the CDN 202.

Figure 3:
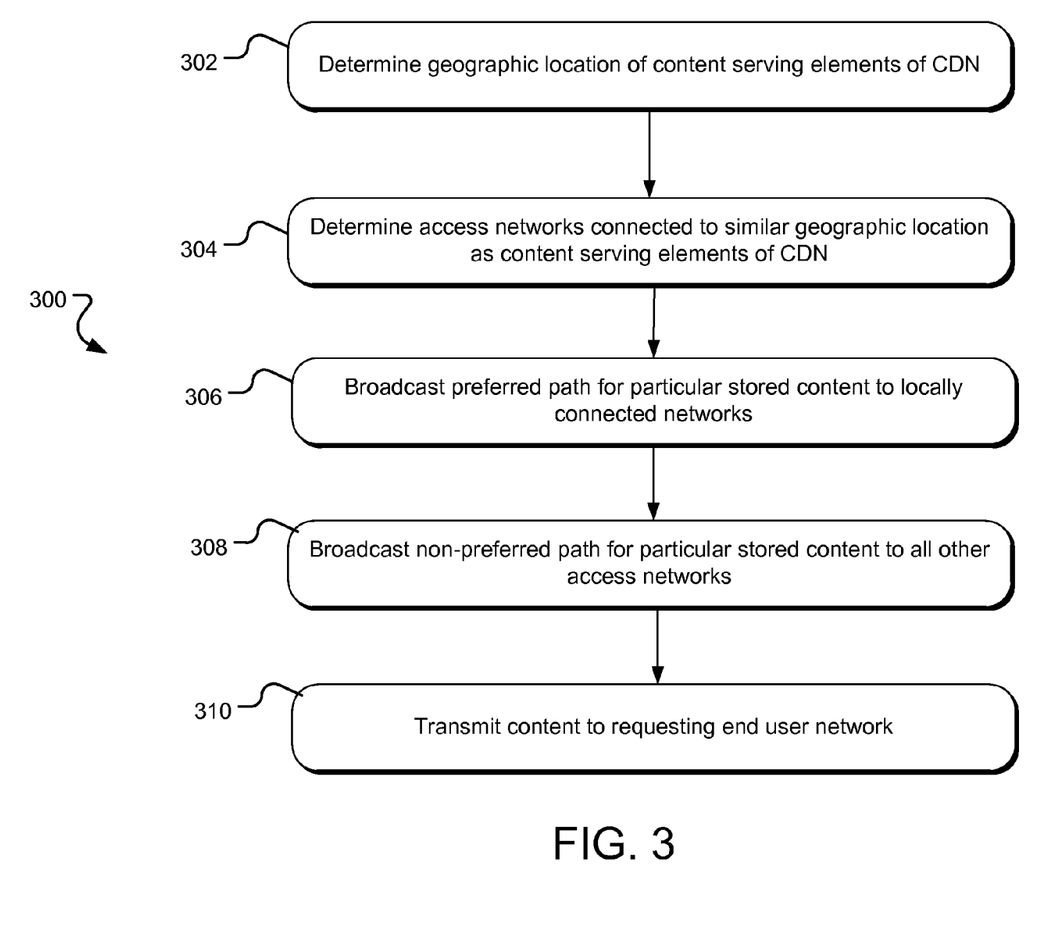
FIG. 3 is a flowchart illustrating a method for manipulating Border Gateway Protocol (BGP) information for a particular content hosted by the CDN to select a low latency and cost effective access network.

However, the CDN 202 generally cannot determine which access network the end user network 203 uses to request the content 242. Rather, the end user network 203 utilizes one or more rules to determine which access network 204-206 through which the content 242 is retrieved. Thus, it may be advantageous for the CDN 202 to influence through which access network 204-206 the content 242 is used by the end user network 203. As such, FIG. 3 is a flowchart illustrating one method for manipulating Border Gateway Protocol (BGP) information for a particular content hosted by the CDN to influence the end user network's 203 access network selection to prefer the network more advantageous to the CDN 202. In general, the operations of FIG. 3 may be performed by any computer network, such as a CDN. In particular, the computer network may include one or more components that may perform the operations of FIG. 3, such as a central server or cluster of servers that perform one or more of the operations described. As used herein, however, the operations are described as being performed by a CDN 202 for simplicity.

Beginning in operation 302 and referring to the network of FIG. 2, the CDN 202 determines the geographic location for content serving elements of the CDN. For example, database 242 may include a particular stored content offered by the CDN 202 for access by one or more end user networks 203. In operation 302, the CDN 202 locates and determines that the database 242 containing content is stored in or near the Seattle, Wash. area 208.

In operation 304, the CDN 202 determines which access network 204, 206 has a connection to the CDN in the same or a similar location as the database 242. In the example shown in FIG. 2, access network B 206 connects to the CDN 202 in or near Seattle 208 through connection 236. Thus, the CDN 202 may determine that access network B 206 connects to the CDN in the same geographic area 208 as the database 242. In contrast, access network A 204 does not connect to the CDN 202 in the Seattle area 208. In this manner, the CDN 202 determines which access networks (in the case of FIG. 2, access network B 206) has a connection 236 to the CDN in the same or similar geographic location 208 as the database 242. In one embodiment, the CDN 202 receives this connection information for the access networks associated with the CDN from the access networks themselves. In another embodiment, the CDN may maintain the connection information of the access networks to the CDN and provide said information to the components of the CDN that may utilize the information, such as a server or other networking device of the CDN performing one of more operations of the method of FIG. 3.

As stated above, the embodiments of the present disclosure discussed herein may apply to any number of computer networks. Thus, the operations discussed not only apply to databases of a CDN, but also apply to any network element that is accessible by an end user device 240, such as a VoIP server, trading platform, general purpose server, and the like. Although the discussion herein centers on a CDN-type network, the operations may also be performed by any type of computer network in relation to the elements of the network.

As discussed above, the CDN 202 may broadcast a path element as part of a BGP feed for the CDN. In particular, the CDN 202 announces the path element of the CDN for the content serving elements of the CDN and available to an end user device to the end users and/or access networks associated with the CDN. In one embodiment, the CDN may announce a four digit number that identifies the CDN 202 as the path, such as the identifier "XXXX". As should be appreciated, the identifier of the CDN 202 may be any number of digits and may include any alphanumeric or binary value.

Similarly, access network A 204 and access network B 206 may also announce a path element using an identifier for the respective networks to the end user networks 203 that are connected to the access networks. Thus, access network A 204 may announce a four digit identifier of "AAAA" and access network B 206 may announce a four digit identifier of "BBBB" to the end user network 203. Similar to the CDN 202, the identifier of the access networks 204-206 may be any number of digits and may include any alphanumeric or binary value.

When content is requested from the end user network 203, the network path elements provide an indication of the path through which the content may be requested or receipt acknowledged by the end user network. In particular, BGP data associated with a content serving element of CDN 202 may be provided to the end user network 203. This data may include a path element containing an identifier of each network through which the end user 240 is connected to the content. For example, the BGP data may include the CDN identifier "XXXX" and access network A identifier "AAAA" when the content is able to be requested through access network A 204. Alternatively, the BGP data may include the CDN identifier "XXXX" and access network B identifier "BBBB" when the content is able to be requested by to the end user network 203 through access network B 206. In this manner, the end user network 203 is aware of which networks are utilized to request or acknowledge receipt of the content to the end user network from the CDN 202.

As mentioned above, a requested content may be requested by the end user network 203 through either access network A 204 or access network B 206. In general, the CDN 202 does not control which access network the end user network 203 selects through which the content is requested or acknowledged. However, it may be assumed in some circumstances, that the end user network 203 will select the path that utilizes the fewest number of networks to receive the content. In general, the end user network 203 understands that content provided through as few networks as possible provides the highest quality of delivered content. Thus, the end user network 203 likely prefers a path to the content that utilizes two networks to a path that utilizes three or more networks. It is with this understanding that the CDN 202 may manage the choice of access networks used to request content from the CDN to an end user device 240.

In particular, the CDN 202 may announce an address for the content serving element used by a particular stored content on the CDN to each access network identified as connected to the CDN in the same geographic region as the content in operation 306. For example, as part of the BGP data provided by the CDN 202 associated with stored content, the CDN may provide a BGP path element consisting solely of the CDN identifier "XXXX". In another embodiment, the CDN 202 may announce a particular address or location within the CDN that the content can be obtained. Regardless, the announcement made in operation 306 is targeted to the access networks that are connected to the CDN 202 in the same or similar geographic area as the particular stored content.

Further, in operation 308, the CDN 202 may announce a separate or different path for the particular content serving element to those access networks that are not connected in the same or similar geographic region. In general, once the CDN 202 has determined which access networks are not connected to the same or similar geographic area as the particular stored content serving element, the CDN may provide an address or path to the content serving element that is different than the path provided to the locally connected access networks. Using the network of FIG. 2 as an example, the CDN 202 may provide an address or pathway for the database 242 to access network A 204 that is different than the address or pathway provided to access network B 206 in response to access network A not being connected to the CDN in the Seattle geographic area 208. Rather, access network A 204 is connected to the CDN 202 in the Denver area 210. The different address or pathway provided to access network A 204 than access network B 206 attempts to encourage the end user network 203 to select access network B to request or acknowledge receipt of the stored content to prevent the end user network 203 from choosing a path that requires data to traverse the Denver area 210 before reaching the database 242. In operation 310, the CDN 202 provides the content to a requesting end user network 203.

The CDN 202 may provide separate addresses or pathways to the locally connected and non-locally connected access networks 204-206 in several ways. In one embodiment, the CDN 202 announces an extended network path element to those access networks 204 that are not locally connected to the same geographic area 208 as the stored content 242. For example, the CDN 202 announces a network path element of "XXXX XXXX" to all non-locally connected access networks 204 and a network path element of "XXXX" to the locally connected access networks. As mentioned above, many end user devices 240 select the network path that provides the fewest networks through which the content is transmitted. Thus, by extending the network path element announced by the CDN 202 to non-locally connected access networks 204 and a typical network path element to the locally connected access networks 206, the CDN may bias the end user network 203 to select the locally connected access network through which the content is provided to the end user device. In this manner, the CDN 202 may prevent the requesting or acknowledgement of receipt for content from the CDN traversing the Denver area 210. Rather, the request and acknowledgement of receipt for content may be transmitted via an access network in the same geographic location as the stored content.

In another embodiment, the CDN 202 may announce a less specific route or address to the particular content 242 stored on the CDN. In particular, the locally connected access networks 206 may receive a specific route or IP address for the content, while the non-locally connected access networks 204 receive a less specific route or IP address. For example, access network B 206 may receive an IP address for the location of the stored content of 4.1.2.X, where X represents any value in the address, or a "don't care" value for the address. Further, access network A 204 may receive a less specific IP address, such as 4.X.X.X, where X represents any value in the address, or a "don't care" value. In general, an end user network 203 will prefer the more specific address or route to the stored content, when given an option for obtaining the content through a plurality of access networks. Thus, by providing a more specific route or address to the locally connected access networks 206, the CDN 202 may influence the end user network 203 to potentially select the locally connected access networks for accessing the available content. Regardless of the embodiment used, however, the CDN 202 may provide a preferred address to the locally connected access networks to prevent the transmission of the content through the CDN network before offloading to an access network.

It should be noted that some business considerations and constraints may prevent the CDN 202 from announcing separate paths to the access networks connected to the CDN. However, such a circumstance is beyond the scope of the present disclosure and is not discussed herein.

In yet another embodiment, the CDN 202 may maintain a preference listing, or tiered preference, of several access network or access network connections through which the content is provided to the end user network 203. For example, assume a case where a resource 242 is located in Houston, access network A 204 connects to the CDN 202 in Chicago while access network B 206 connects to the CDN in both Dallas and Chicago. Through the methods described above, the resource would ideally be provided through an access network that connects in Houston. However, because no access network connects to the CDN 202 in Houston, a "next-best" connection point may be selected. In this example, the CDN 202 selects to provide the resource through the Dallas connection, or access network B 206. If a Dallas connection to an access network also wasn't detected by the CDN 202, the next ideal access network may be selected, and so on. Thus, in this embodiment, the CDN 202 would use the access network that is most preferred, but if such a network is not available, the next preferred network would be selected for providing the content. The CDN 202 may continue in this manner until the least preferred access network is selected, if that access network is the only available access network to provide the content.

In this embodiment, any access network attribute may be utilized to determine most preferred to least preferred. For example, geographic proximity to the resource may be used to determine access network preference. In another example, availability of access network ports may be considered when determining access network preference. In other examples, a combination of access network attributes may be analyzed to determine the preference of access network for a particular resource of the CDN 202.

Figure 4:
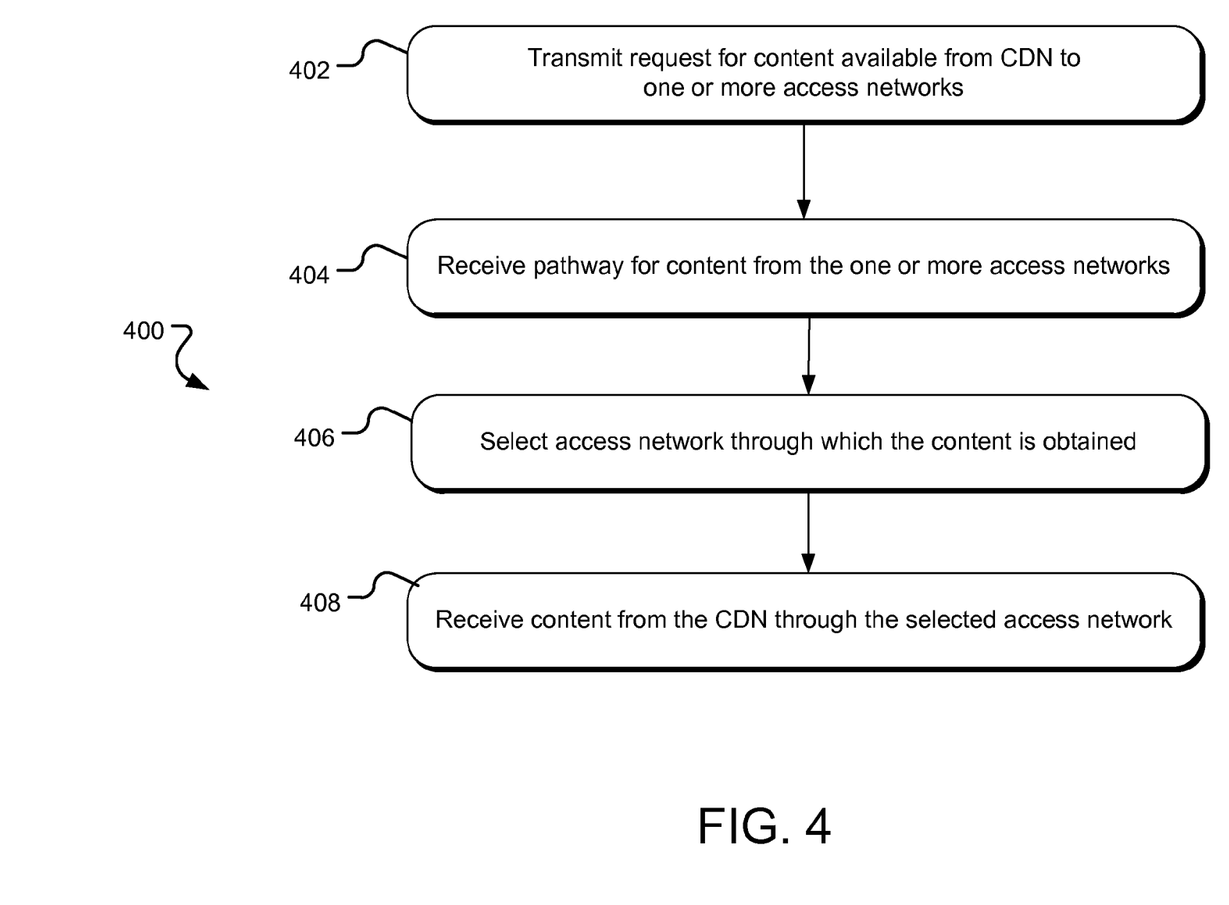
FIG. 4 is a flowchart illustrating a method for an end user network to request content from a CDN through one or more access networks.

FIG. 4 is a flowchart illustrating a method for an end user network to request content from a CDN through one or more access networks. In general, the operations of the method of FIG. 4 are performed by an end user network, such as an ISP associated with an end user device. Further, the end user network may be connected to a plurality of access networks that are, in turn, connected to a CDN that provides content to the end user device upon request.

Beginning in operation 402, the end user network transmits a request for one or more instances of content stored on the CDN and made available to end user devices associated with the CDN. In one example, the stored content may be a video or audio file available to the end user device. In addition, the end user network may provide the request to one or more of the access networks to which the end user network is associated. The end user network may attempt to contact the CDN with the request through any one of the access networks. Further, the access networks may have stored BGP information about the requested content. This BGP information may include a location, path or route through which the content is available to end user network from the CDN.

In operation 404, the end user network receives a pathway from one or more of the access networks through which a connection to the CDN is available. In one example, the pathway may include the BGP information that provides a virtual location within the CDN of the requested content or content serving element of the CDN. Further, the received pathways may vary, depending on which access network provides the pathways to the end user device.

The end user network, in operation 406, then selects a pathway to request the stored content. However, as described above, the end user network may be configured to prefer some received pathways over other received pathways. For example, the end user network may be configured to select the route that includes the fewest number of networks (as indicated through the BGP information concerning the stored content). In another example, the end user network may be configured to select the route that includes the most specific virtual location of the content. In general, the end user network may utilize any algorithm or decision tree to determine which access network is selected to access the content on the CDN. In operation 408, the end user network receives the content from the selected access network for use by the end user.

By providing a more preferred pathway of requested content to access networks that are connected to a network in the same area as the content, the network may reduce the number of components and distance communications travel between a requesting end user network and the network itself. In general, the network determines a connection relationship between the network and one or more access networks. In particular, the network determines which geographic areas the one or more access networks connect to the network. In addition, the network may locate the geographic area for a particular network element. To reduce the transmission of the communications between an end user and the network, the network may correlate the network element with the one or more access networks that connect to the network in the same or similar geographic areas.

Figure 5:
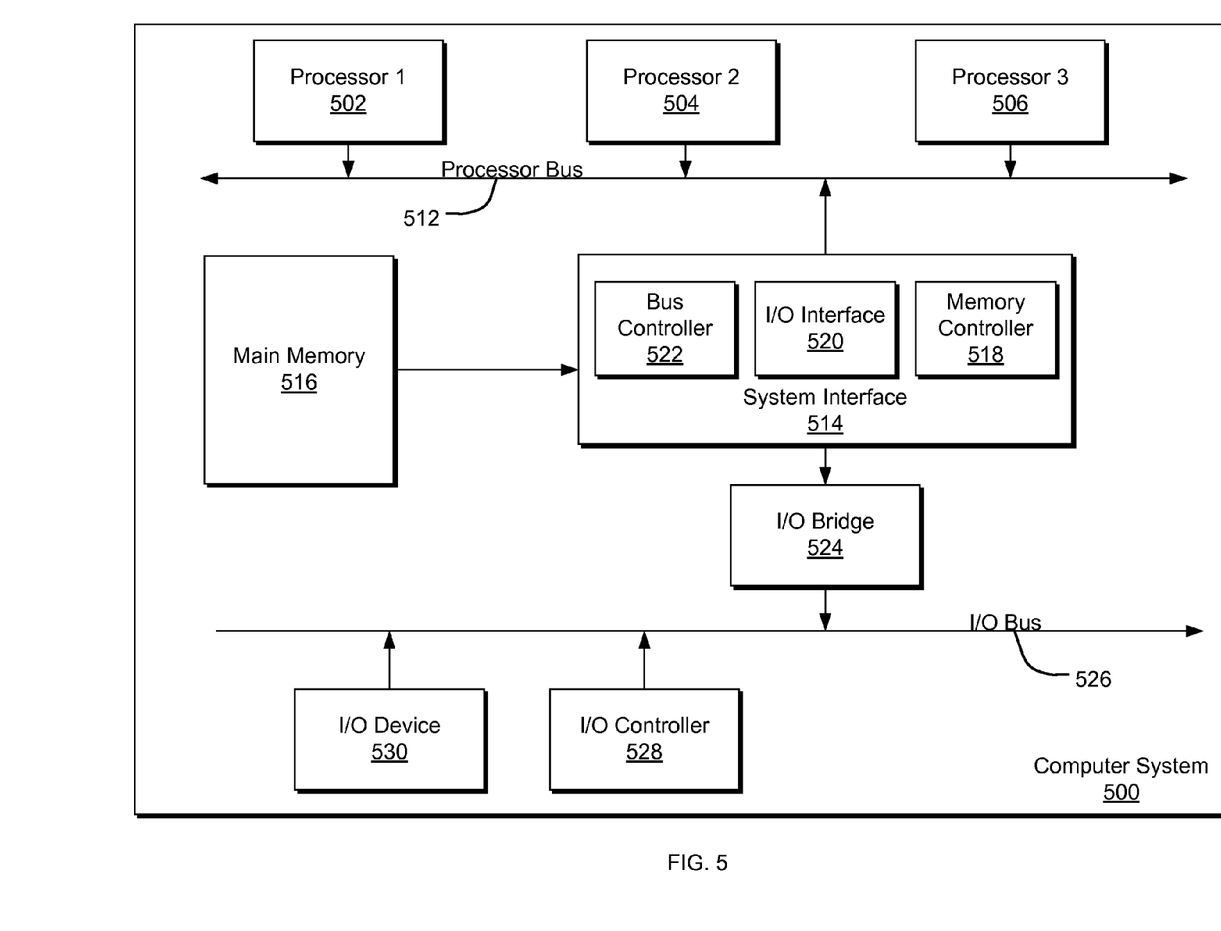
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the network disclosed above. In particular, the computing device of FIG. 5 is one embodiment of the server or other networking component that performs one of more of the operations described above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for optimizing inbound traffic for a network, the method comprising:
   storing, in a network device of a computer network, a geographic area of a particular component of the computer network;
   obtaining geographic areas for each connection between the computer network and a plurality of access networks;
   comparing the geographic area of the particular component of the computer network and the geographic areas for each connection between the computer network and the plurality of access networks to determine a first subset of the plurality of access networks, wherein the first subset of the plurality of access networks comprises the one or more access networks that connect to the computer network in the same geographic area as the geographic area of the particular component of the computer network; and
   transmitting a preferred path element for the particular component of the computer network to the first subset of the plurality of access networks.

2. The method of claim 1 further comprising:
   determining a second subset of the plurality of access networks, wherein the second subset of the plurality of access networks comprises one or more access networks that do not connect to the computer network in the same geographic area as the geographic area of the particular component of the computer network.

3. The method of claim 2 further comprising:
   transmitting a non-preferred path element for the particular component of the computer network to the second subset of the plurality of access networks.

4. The method of claim 3 wherein the preferred path element for the particular component of the computer network comprises an identification of the computer network in a border gateway protocol information associated with the particular component of the computer network, the identification comprising a first number of alphanumeric numbers.

5. The method of claim 4 wherein the non-preferred path element for the particular component of the computer network comprises an identification of the computer network in the border gateway protocol information associated with the particular component of the computer network, the identification comprising a second number of alphanumeric numbers that is more than the first number of alphanumeric numbers.

6. The method of claim 3 wherein the preferred path element for the particular component of the computer network comprises a first address within the content distribution network in a border gateway protocol information associated with the particular component of the computer network, the first address comprising at least one don't care value.

7. The method of claim 6 wherein the non-preferred path element for the particular component of the computer network comprises a second address within the computer network in a border gateway protocol information associated with the particular component of the computer network, the second address comprising a plurality of don't care values, the plurality of don't care values of the second address being more than the at least one don't care value of the first address.

8. The method of claim 1 further comprising:
   maintaining an ordered preference listing of the plurality of access networks, wherein the order of the preference listing of the plurality of access networks is based at least on the geographic areas for each connection between the computer network and the plurality of access networks.

9. A computer network comprising:
   a networking device configured to communicate with an end user network associated with the computer network; and
   a computer network component configured to:
      obtain a geographic area of the networking device;
      receive geographic areas for each connection between the computer network and a plurality of access networks;
      compare the geographic area of the networking device and the geographic areas for each connection between the computer network and the plurality of access networks to determine a first subset of the plurality of access networks comprising one or more access networks that connect to the computer network in the same geographic area as the geographic area of the networking device; and
      transmit a preferred access route for the networking device to the first subset of the plurality of access networks.

10. The computer network of claim 9, wherein the computer network component is further configured to:
   determine a second subset of the plurality of access networks, wherein the second subset of the plurality of access networks comprises one or more access networks that do not connect to the computer network in the same geographic area as the geographic area of the networking device.

11. The computer network of claim 10, wherein the computer network component is further configured to:
transmit a non-preferred access route for the networking device to the second subset of the plurality of access networks.

12. The computer network of claim 11 wherein the preferred access route for the networking device comprises an identification of the computer network in a border gateway protocol information associated with the networking device, the identification comprising a first number of alphanumeric numbers.

13. The computer network of claim 12 wherein the non-preferred access route for the networking device comprises an identification of the computer network in the border gateway protocol information associated with the networking device, the identification comprising a second number of alphanumeric numbers that is more than the first number of alphanumeric numbers.

14. The computer network of claim 11 wherein the preferred access route for the networking device comprises a first address within the computer network in a border gateway protocol information associated with the networking device, the first address comprising at least one don't care value.

15. The computer network of claim 14 wherein the non-preferred access route for the networking device comprises a second address within the computer network in a border gateway protocol information associated with the networking device, the second address comprising a plurality of don't care values, the plurality of don't care values of the second address being more than the at least one don't care value of the first address.

16. The computer network of claim 9 wherein the networking device is a content-providing server of a content distribution network.

17. A system for operating a computer network, the system comprising:
a server comprising:
a processor; and
a computer-readable medium associated with the processor and including instructions stored thereon and executable by the processor to:
storing, in the server, a geographic area of a particular component of the computer network;
obtaining geographic areas for each connection between the computer network and a plurality of access networks;
comparing the geographic area of the particular component and the geographic areas for each connection between the computer network and a plurality of access networks to determine a first subset of the plurality of access networks, wherein the first subset of the plurality of access networks comprises the one or more access networks that connect to the computer network in the same geographic area as the geographic area of the particular component; and
transmitting a preferred element of an access path for the particular component to the first subset of the plurality of access networks.

18. The system of claim 17 wherein the instructions stored on the computer-readable medium further causes the processor to:
determining a second subset of the plurality of access networks, wherein the second subset of the plurality of access networks comprises one or more access networks that do not connect to the computer network in the same geographic area as the geographic area of the particular component; and
transmitting a non-preferred element of the access path for the particular component to the second subset of the plurality of access networks.

19. The system of claim 18 wherein the preferred element of the access path for the particular component comprises an identification of the computer network in a border gateway protocol information associated with the particular component, the identification comprising a first number of alphanumeric numbers.

20. The system of claim 19 wherein the non-preferred element of the access path for the particular component comprises an identification of the computer network in the border gateway protocol information associated with the particular component, the identification comprising a second number of alphanumeric numbers that is more than the first number of alphanumeric numbers.

* * * * *